United States Patent
Li et al.

(10) Patent No.: US 7,847,752 B2
(45) Date of Patent: Dec. 7, 2010

(54) SWITCHING SCHEMES FOR MULTIPLE ANTENNAS

(75) Inventors: Qinghua Li, Pleasanton, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/545,496

(22) Filed: Aug. 21, 2009

(65) Prior Publication Data

US 2009/0310506 A1     Dec. 17, 2009

Related U.S. Application Data

(63) Continuation of application No. 10/607,801, filed on Jun. 27, 2003, now Pat. No. 7,595,768.

(51) Int. Cl.
*H01Q 21/00* (2006.01)
(52) U.S. Cl. .................................... 343/893
(58) Field of Classification Search ................ 343/893; 455/133–135
See application file for complete search history.

(56) References Cited

U.S. PATENT DOCUMENTS

| | | | |
|---|---|---|---|
| 4,937,586 A * | 6/1990 | Stevens et al. | 343/702 |
| 5,748,676 A | 5/1998 | Mahany | |
| 6,085,076 A | 7/2000 | Lindsay et al. | |
| 6,768,457 B2 | 7/2004 | Lindenmeier | |
| 6,965,353 B2 * | 11/2005 | Shirosaka et al. | 343/802 |
| 7,554,508 B2 * | 6/2009 | Johnson et al. | 343/893 |
| 7,558,554 B2 * | 7/2009 | Hoo et al. | 455/277.1 |
| 2002/0196183 A1 | 12/2002 | Lindenmeier | |
| 2003/0119468 A1 | 6/2003 | Meehan et al. | |
| 2005/0062667 A1 * | 3/2005 | Shirosaka et al. | 343/794 |

OTHER PUBLICATIONS

Non-Final Office Action Mailed Feb. 12, 2010, Chinese Patent Application No. 200480018098.8.

* cited by examiner

*Primary Examiner*—Huedung Mancuso
(74) *Attorney, Agent, or Firm*—Kacvinsky Daisak PLLC

(57) ABSTRACT

Signals from multiple antennas are evaluated in a wireless device having one receiver chain and the antenna receiving the highest quality signals is selected. The signal quality from the multiple antennas may be evaluated using the short symbols in the preamble or the beacon signals and the antennas dynamically selected to improve the performance of the wireless communications device.

19 Claims, 3 Drawing Sheets

SWITCHING SCHEMES FOR MULTIPLE ANTENNAS

Today's portable communication products such as cellular telephones and laptop computers require reception of an accurate data stream for effective operation. The signal received by two antennas on a Network Interface Card (NIC) may be sequentially evaluated, with the antenna supplying the best signal quality selected to further receive data. Thus, the NIC may be used to evaluate signals received through two antennas and based on the evaluation, lock onto the signal with the best quality. This capability of selection is referred to as "switched diversity" and provides signal gain over a product that does not provide signal quality selection in combating signal fading.

It would be advantageous to have an improved method and circuit for evaluating signals from multiple antennas and selecting the signal with the desired signal qualities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in laptop computers, smart phones, communicators and Personal Digital Assistants (PDAs), medical or biotech equipment, automotive safety and protective equipment, and automotive infotainment products. However, it should be understood that the scope of the present invention is not limited to these examples.

Figure 1:
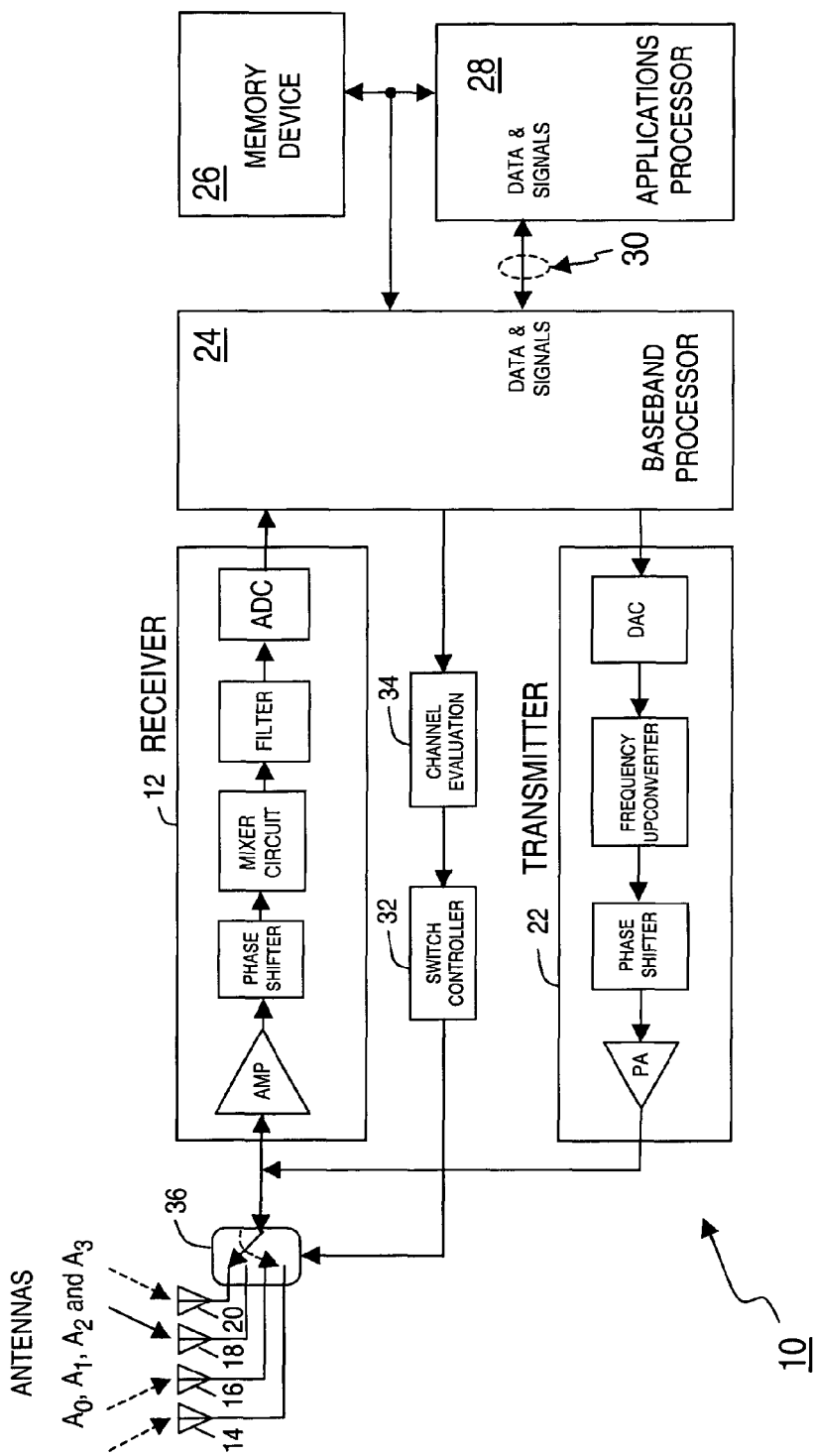
FIG. 1 illustrates a wireless communications device having features for evaluating and selecting signals received from multiple antennas in accordance with the present invention.

FIG. 1 illustrates a wireless communications device 10 having features for evaluating and selecting signals received from multiple antennas in accordance with the present invention. In this device the transceiver receives and transmits modulated signals from four sectored antennas 14, 16, 18 and 20, although the number of antenna is not a limitation of the present invention. The receiver chain may include amplifiers such as, for example, Low Noise Amplifiers (LNAs) and Variable Gain Amplifiers (VGAs) to amplify signals received from the selected antenna. Then, a mixer circuit receives the modulated signals and down-converts the carrier frequency of the modulated signals. The down-converted signals may then be filtered and converted to a digital representation by Analog-To-Digital Converters (ADCs).

A baseband processor 24 may be connected to the ADC to provide, in general, the digital processing of the received data within communications device 10. Baseband processor 24 may process the digitized quadrature signals, i.e., the in-phase "I" signal and the quadrature "Q" signal from the receiver chain. On the transmitter side, transmitter 22 may receive digital data processed by baseband processor 24 and use the Digital-to-Analog Converter (DAC) to convert the digital data to analog signals for transmission from multiple antennas 14, 16, 18 and 20. Note that receiver 12 and/or transmitter 22 may be embedded with baseband processor 24 as a mixed-mode integrated circuit, or alternatively, the transceiver may be a stand-alone Radio Frequency (RF) integrated circuit.

An applications processor 28 may be connected to baseband processor 24 through a signaling interface 30 that allows data to be transferred between baseband processor 24 and applications processor 28. A memory device 26 may be connected to baseband processor 24 and applications processor 28 to store data and/or instructions. In some embodiments, memory device 26 may be a volatile memory such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

A channel evaluation circuit 34 evaluates the signal qualities of the signals received by the multiple antennas and processed in the receiver chain and sets priorities to select the signals having the best quality. Although channel evaluation circuit 34 is shown in FIG. 1 as receiving a digital input, it should be noted that an analog signal from the receiver chain may alternatively be used without changing the scope of the invention. A switch controller 32 receives the selection criteria from the channel evaluation circuit 34 and controls a switch 36 to lock onto the antenna that provides the best signal quality. The evaluation and selection scheme dynamically improves the performance of wireless communications device 10.

Figure 2:
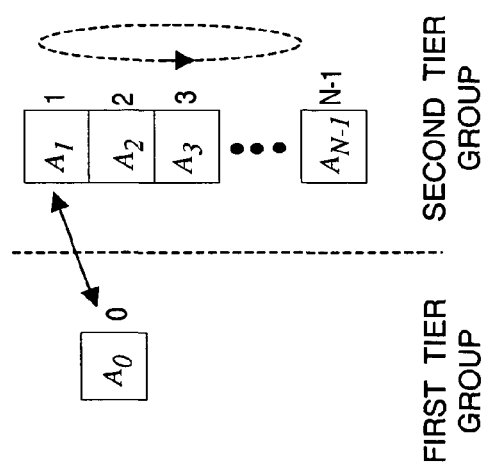
FIG. 2 illustrates a scheme for dynamically tracking the channel variation that affects the signals received by the multiple antennas.

FIG. 2 illustrates a scheme for dynamically tracking the channel variation that affects the signals received by the multiple antennas in receiver 12. For simplicity of illustration and by way of example, signals from the four antennas $A_0, A_1, A_2$ and $A_3$ may be evaluated, but it should be pointed out that features of the present invention allow signals from any number of antennas to be evaluated.

To initiate a high-speed wireless Internet connection, laptop computers or other portable devices with Wi-Fi cards (or wireless fidelity) may tap into wireless Access Points (APs) which may be physically connected to high-speed networks. The AP may then transmit frames between network points as a unit complete with the addressing and protocol control information.

The frame is usually transmitted serially and contains a header field and a trailer field that "frame" the data. Part of the frame that is transmitted by an 802.11 WLAN device is called the preamble, with differing preamble formats for the various protocols. For instance, the preamble for an 802.11a device comprises ten short and two long symbols used for synchronization and may contain data pertinent to signal detection such as Automatic Gain Control (AGC), diversity selection, frequency offset estimation, timing synchronization, etc. It should be noted that the preamble for other 802.11 devices such as 802.11b and 802.11g is different from that of an 802.11a device. For instance, 802.11b does not include short symbols in the preamble training sequence.

In accordance with the present invention, the preamble transmitted by any 802.11 WLAN device has a further use by wireless communications device 10.

Additionally, the preamble may be used to verify the relative quality of signals received by the multiple antennas. In other words, the present invention may be applied to all 802.11 protocols including the most popular ones, i.e., 802.11b, 802.11a, 802.11g and 802.11n. The preamble as a whole, no matter whether repeating or not, may be subdivided and individual portions used by the different antennas. Thus, the subdivided preamble portions for any 802.11 protocol may be used for training wireless communications device 10.

The antenna selection scheme illustrates the dynamic selection and antenna priority process that enables wireless communications device 10 to process signals having the highest quality. By way of example, the four antennas $A_0, A_1, A_2$ and $A_3$ may be partitioned into two groups, with one group including antennas $A_0$ and $A_2$ and the other group including antennas $A_1$ and $A_3$. With the arrival of the first portion of the preamble, receiver 12 sequentially evaluates the signals received by the antennas in the first group during the training period. By way of example, antenna $A_0$ may use the first 5.5 symbols and antenna $A_2$ may use the subsequent 1.8 symbols. Then, with the arrival of the each symbol, receiver 12 sequentially evaluates the signals received from antennas in the second group during the second short training symbol.

A comparison of the signals received by the first group may show the signal received by antenna $A_0$, for example, to be the highest quality. A comparison of the signals received by the second group may show the signal received by antenna $A_1$, for example, to be the highest quality. Then, a further comparison between the highest rated signals and corresponding antennas from the first and second groups may show, for example, that the signal received by antenna $A_0$ to be the highest quality. Accordingly, antenna $A_0$ may be selected for the "first tier group" with the other antennas placed in the "second tier group."

Thus, in this embodiment channel evaluation circuit 34 (see FIG. 1) evaluates signals received by all of the antennas, selecting the one antenna that provides the highest quality signal for the "first tier group" and holding all other antennas in the "second tier group." As subsequent preamble packets are received, switch controller 32 "pairs" the one antenna in the "first tier group" with an antenna selected from the "second tier group". With the arrival of each preamble packet, channel evaluation circuit 34 pairs the one antenna with a different antenna selected from the "second tier group" to determine the antenna combination that provides wireless communications device 10 with the highest performance.

By pairing the one antenna from the "first tier group" in sequential fashion with an antenna selected from the "second tier group", the antennas and antenna combinations may be evaluated. Based on the evaluations, a determination may be made as to whether the antenna in the "first tier group" should be replaced with an antenna from the "second tier group" if that antenna provides a higher quality signal. By way of example, antenna $A_0$ in position 0 may be exchanged with antenna $A_1$ in position 1. In this case, antenna $A_1$ in position 0 is the one antenna in the "first tier group" that is combined with antenna selected from the "second tier group" for evaluation.

It should be pointed out that the scheme illustrated in FIG. 2 for dynamically tracking the channel variation may be generalized to evaluate more than two antennas for each preambled packet. This may be very useful for 802.11b that has longer preambles that may be used by wireless communications device 10 to support additional antenna evaluations. One modification from the illustrated scheme may include selecting M−1 antennas in the second tier group (instead of selecting the one antenna as shown). With longer preambles receiver 12 is capable of evaluating M antennas for each preambled packet. By way of example, receiver 12 may select antennas at positions mod(i, N−1)+1, . . . , mod(i+M−1,N−1)+1 for evaluation during the current preambled packet and set i=mod(i+M−1,N−1)+1 for the next preambled packet.

Figure 3:
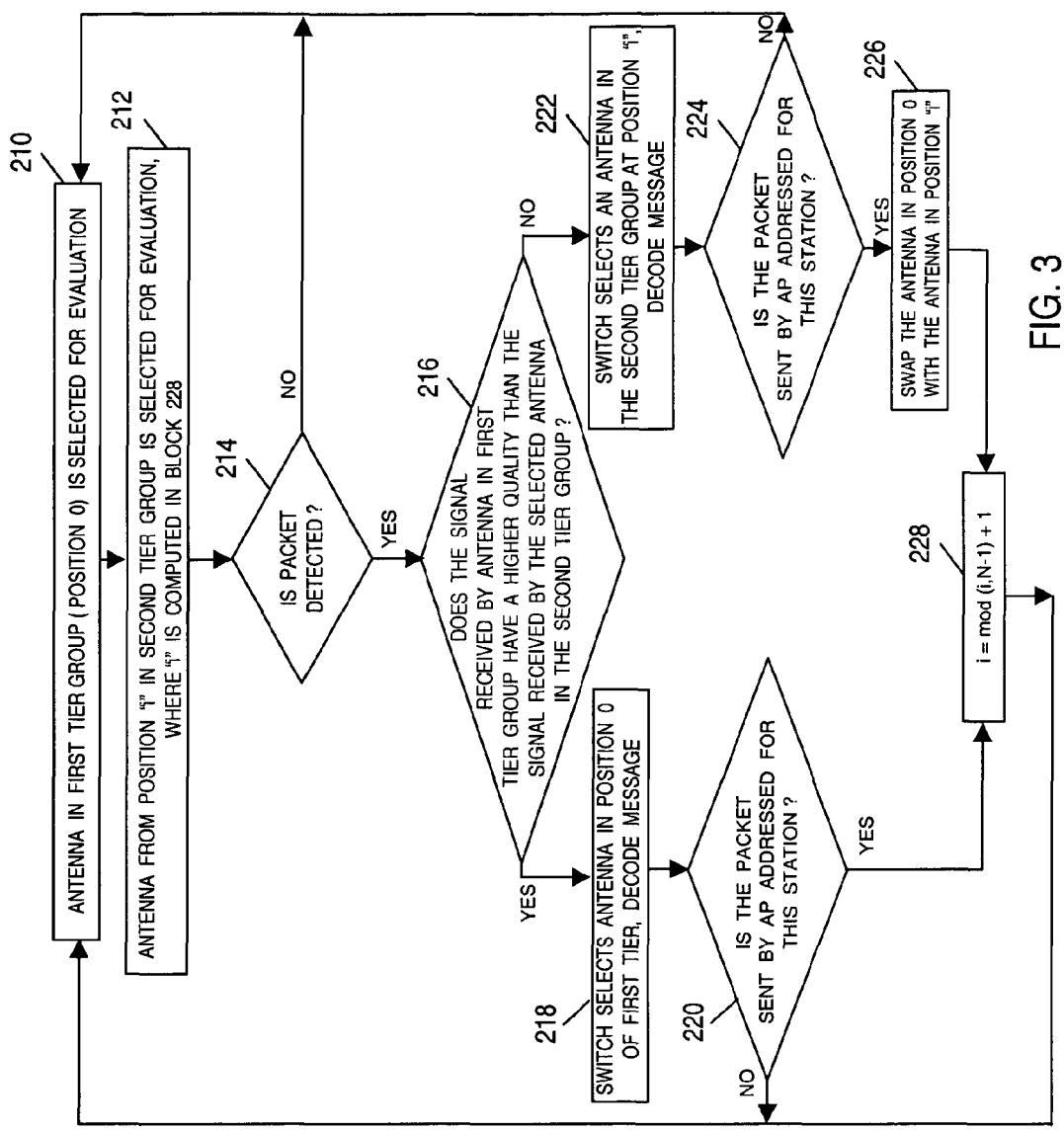
FIG. 3 illustrates the evaluation process for selecting antennas that provide the wireless communications device with the highest performance.

FIG. 3 is a diagram showing the evaluation process for the scheme illustrated in FIG. 2 for selecting two antennas to provide wireless communications device 10 with the highest performance. In this process the one antenna in position 0 from the "first tier group" is evaluated (Block 210). An antenna from the "second tier group", i.e., an antenna in position 1, 2, 3, . . . , or N−1, is selected for evaluation (Block 212). Following the evaluation and comparison of the two antennas, the antenna with the best signal quality is selected and a determination made as to whether the packet is detected (Block 214). If the packet is not detected, the signals from the antenna are evaluated again.

On the other hand, if the packet is detected a determination is made about the relative signal quality of the one antenna in position 0 and the paired antenna from the "second tier group" (Block 216). If the antenna in the "first tier group" has the best signal quality, switch controller 32 (see FIG. 1) selects the signal from the antenna in "first tier group" for processing through receiver 12 in decoding the received message (Block 218). The address in the packet sent by the AP is verified (Block 220), and if valid, the one antenna in position 0 from the "first tier group" is paired with another antenna from the "second tier group" (Block 228) to start the evaluation process for the next packet.

Returning to Block 216, if the antenna in the "first tier group" does not have the best signal quality, switch controller 32 (see FIG. 1) selects the signal from the paired antenna in "second tier group" for processing through receiver 12 in decoding the received message (Block 222). The address in the packet sent by the AP is verified (Block 224), and if valid, the paired antenna from the "second tier group" is exchanged with the antenna from the "first tier group" (Block 226). Again, the antenna providing the highest quality signal is placed in position 0 in the "first tier group". The antenna in position 0 is paired with an antenna from the "second tier group" (Block 228) to start the evaluation process for the next packet.

The antenna receiving the signal having the highest quality is detected within three packets and that antenna is selected and employed to receive further packets. Thus, this scheme dynamically determines the best antenna from all other antennas and directs switch controller 32 to actively receive further packets from that antenna.

Figure 4:
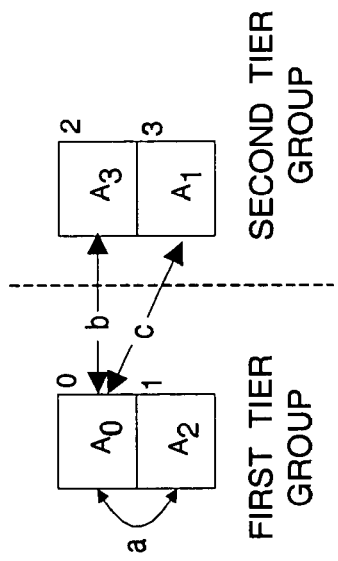
FIG. 4 illustrates another embodiment that dynamically tracks channel variations that may affect the signals received by the multiple antennas.

FIG. 4 illustrates another embodiment that dynamically tracks channel variations that may affect the signals received by the multiple antennas in receiver 12. This embodiment includes at least two antennas in the "first tier group", with antennas being placed in this group based on a higher probability of receiving quality signals. For the example where wireless communications device 10 includes four antennas, two antennas (e.g., antennas $A_0$ and $A_2$) are placed in the "first tier group" and two antennas (e.g., antennas $A_1$ and $A_3$) are placed in the "second tier group". A comparison "a" between antennas $A_0$ and $A_2$ is more frequent than comparisons "b" or "c" because antennas $A_0$ and $A_2$ have been evaluated as the most likely candidates to provide the highest quality signals.

Various comparison sequences are possible. One example is a sequence of comparisons a, b, a, c, followed by a repeat of the sequence. Another example is sequence of comparisons a, a, b, a, a, c, followed by a repeat of the sequence. For any comparison sequence, antenna may exchange groups in order to maintain the "first tier group" as the antennas with the higher probability of receiving quality signals. Thus, after each comparison the antennas may be repositioned to maintain antenna in the proper tier groups.

Figure 5:
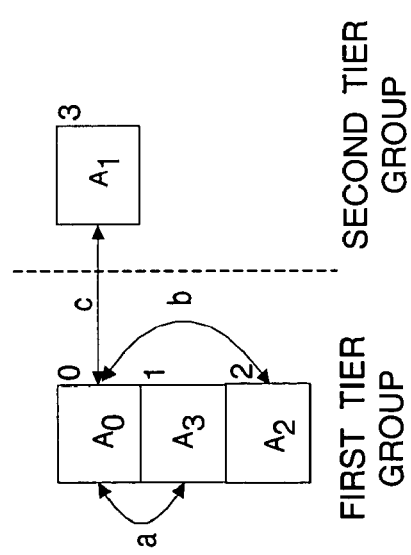
FIG. 5 illustrates yet another embodiment that dynamically tracks channel variations that may affect the signals received by the multiple antennas.

FIG. 5 illustrates a comparison scheme for yet another embodiment that dynamically tracks channel variations that may affect the signals received by the multiple antennas in receiver 12. This embodiment includes more antennas in the "first tier group" than in the "second tier group." The antenna partitioning for this embodiment may be suited, for example, a Line-Of-Sight (LOS) situation where one sector has the best signal and two neighboring sectors have the second/third best channels. At least these three antennas would be placed in the "first tier group" based on a higher probability of receiving quality signals. Antenna for other antenna sectors would be placed in the "second tier group."

Various comparison sequences are again possible. One example is a sequence of comparisons a, b, a, b, c, followed by a repeat of the sequence. Another example is sequence of comparisons a, b, a, b, a, b, c, followed by a repeat of the sequence. The comparison sequences are intended to increase the likelihood of choosing the antenna that provides the best quality signal. For any comparison sequence, antenna may exchange groups in order to maintain the "first tier group" as the antennas with the higher probability of receiving quality signals. Thus, after each comparison the antennas may be repositioned to maintain each antenna in the proper tier groups.

Figure 6:
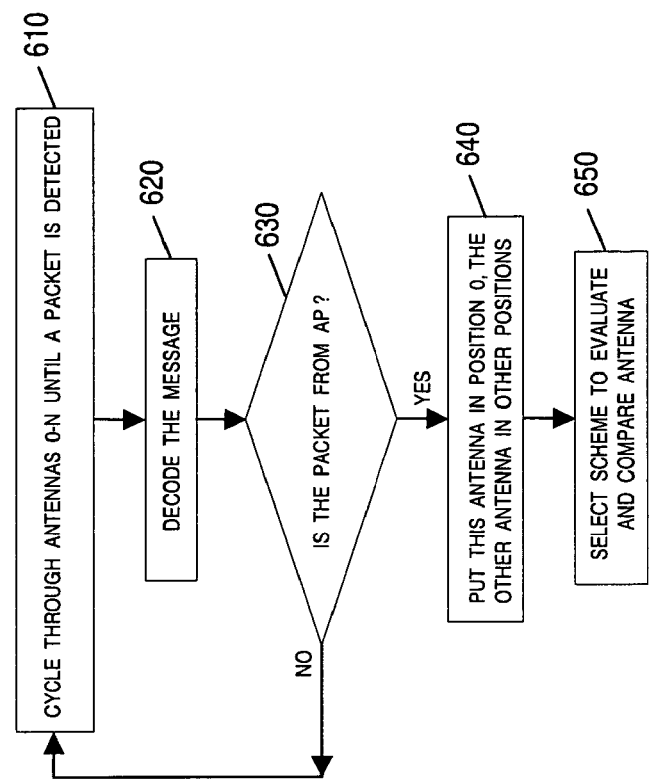
FIG. 6 illustrates a procedure for initiating coverage or booting up the wireless communications device.

FIG. 6 illustrates a procedure for initiating coverage or booting up wireless communications device 10. Channel evaluation circuit 34 and switch controller 32 direct switch 36 to rotate or cycle through the multiple antennas until detecting a packet (Block 610). The message is decoded (Block 620) by processor 24 and checked for a correct address from the AP (Block 630). The antenna that provided the packet is placed in position 0, i.e., indicating the highest priority for receiving a quality signal, and other antenna are placed in other positions (Block 640). One of the schemes used to evaluate and compare signals is selected by processor 24 and made operational in wireless communications device 10 (Block 650).

By now it should be apparent that a method and circuitry have been presented for incorporating multiple antenna with one receiver chain and selecting the antenna that provide the highest quality signals to the processor. The signal quality may be evaluated using the preamble or the beacon signals to ensure that the wireless device receives the best quality signals possible.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
   partitioning multiple antennas into a first tier and a second tier, the first tier having one antenna selected as a receiving antenna and non-selected antenna in the second tier;
   receiving a framed digital signal having preamble symbols in a mobile device;
   sequentially switching the non-selected antenna in the second tier to process portions of the preamble symbols in a receiver of the mobile device to evaluate a signal quality of signals received by the non-selected antenna; and
   pairing each non-selected antenna in the second tier, one by one, with the receiving antenna in the first tier to dynamically determine a pair having a highest signal quality.

2. The method of claim 1 wherein evaluating a signal quality of signals received by the non-selected antenna further comprises:
   demodulating the signals in a single receiver chain to generate quadrature signals; and
   comparing the quadrature signals to determine which of the non-selected antenna in the second tier provides a higher signal quality.

3. The method of claim 1 further comprising:
   comparing the signal quality of the signals received by the non-selected antenna in the second tier, one by one, with a signal quality of the receiving antenna in the first tier to dynamically determine an antenna having a higher signal quality.

4. The method of claim 1 further comprising:
   evaluating each pair to determine whether to replace the receiving antenna in the first tier with a non-selected antenna in the second tier.

5. The method of claim 1 further comprising:
   replacing the receiving antenna in the first tier with a non-selected antenna in the second tier that has a higher signal quality than the receiving antenna in the first tier.

6. A method, comprising:
partitioning a first antenna in a first tier and second and third antennas in a second tier;
controlling a switch in a transceiver of a mobile device to sequentially provide signals received by the second and third antennas to an input of a single receiver where preamble symbols are used to evaluate signal quality for the second and third antennas in a single frame; and
pairing the second and third antennas in the second tier, one by one, with the first antenna in the first tier to dynamically determine a pair having a highest signal quality.

7. The method of claim 6 further comprising:
comparing the signal quality of the signals received by the second and third antennas in the second tier, one by one, with the signal quality of the first antenna in the first tier to dynamically determine an antenna having a higher signal quality.

8. The method of claim 6 further comprising:
selecting the second or third antenna having a higher signal quality than a signal quality of the first antenna to replace the first antenna in the first tier.

9. The method of claim 6 further comprising:
evaluating the signals received by the second and third antennas to compare the signals received by the second and third antennas as to the signal quality.

10. The method of claim 6 further comprising:
evaluating each pair to determine whether to replace the first antenna in the first tier with the second or third antennas in the second tier; and
replacing the first antenna in the first tier with the second or third antennas in the second tier that has a higher signal quality than the first antenna in the first tier.

11. A system comprising:
a Network Interface Card (NIC) having at least three antennas coupled through a switch to an input of a single receiver in a mobile device; and
a processor coupled to the single receiver to compare quadrature signals that are demodulated from preamble symbols sequentially received by the at least three antennas, wherein the processor selects an antenna that provides a highest quality signal as a receiving antenna in a first tier and places the second and third antennas in a second tier, and pairs the second and third antennas in the second tier, one by one, with the receiving antenna in the first tier to dynamically determine a pair having a higher signal quality.

12. The system of claim 11 wherein the processor further compares a signal quality of the signals received by the second and third antennas in the second tier, one by one, with a signal quality of the receiving antenna in the first tier to dynamically determine an antenna having a higher signal quality.

13. The system of claim 11 wherein the processor further selects the second or third antenna having a higher signal quality than a signal quality of the receiving antenna to replace the receiving antenna in the first tier as the receiving antenna for the mobile device.

14. The system of claim 11, wherein the preamble symbol is received from an 802.11 a/b station and the preamble symbol includes ten short and two long symbols.

15. The system of claim 11 further including:
a Static Random Access Memory (SRAM) coupled to the processor.

16. An article, comprising:
selecting an antenna that provides a highest quality signal as a receiving antenna in a first tier and placing non-selected antenna in a second tier;
retrieving a framed digital signal having preamble symbols in a mobile device;
pairing each non-selected antenna in the second tier, one by one, with the receiving antenna in the first tier where the preamble symbols are used to dynamically determine a pair having a highest signal quality.

17. The article of claim 16 further comprising:
comparing a signal quality of the signals received by the non-selected antenna in the second tier, one by one, with a signal quality of the receiving antenna in the first tier to dynamically determine an antenna having a higher signal quality.

18. The article of claim 16 further comprising:
selecting a non-selected antenna having a higher signal quality than a signal quality of the receiving antenna to replace the receiving antenna in the first tier.

19. The article of claim 16 further comprising:
evaluating each pair to determine whether to replace the receiving antenna in the first tier with a non-selected antenna in the second tier; and
replacing the receiving antenna in the first tier with the non-selected antenna in the second tier that has a higher signal quality than the receiving antenna in the first tier.

* * * * *